(12) United States Patent
Buchwitz et al.

(10) Patent No.: US 7,878,287 B2
(45) Date of Patent: Feb. 1, 2011

(54) SUBFRAME-LOCATING DEVICE

(75) Inventors: Joe L. Buchwitz, Huntington Woods, MI (US); Tim D. Smith, Brighton, MI (US)

(73) Assignee: Ford Motor Company, Dearborn, MI (US)

( * ) Notice: Subject to any disclaimer, the term of this patent is extended or adjusted under 35 U.S.C. 154(b) by 860 days.

(21) Appl. No.: 11/635,650

(22) Filed: Dec. 8, 2006

(65) Prior Publication Data
US 2008/0134490 A1    Jun. 12, 2008

(51) Int. Cl.
B62D 21/00 (2006.01)
(52) U.S. Cl. .................. 180/312; 180/311; 180/299; 280/124.109
(58) Field of Classification Search .................. 180/311, 180/312, 299; 280/781, 124.109; 29/464, 29/897.2, 281.4, 468
See application file for complete search history.

(56) References Cited

U.S. PATENT DOCUMENTS

| 4,263,980 | A | * | 4/1981 | Harlow et al. ................ 180/292 |
| 5,040,917 | A | * | 8/1991 | Camuffo .................. 403/408.1 |
| 5,542,707 | A | * | 8/1996 | Kamei et al. ................ 280/834 |
| 5,641,180 | A |   | 6/1997 | Kamei et al. |
| 5,862,877 | A | * | 1/1999 | Horton et al. ................ 180/312 |
| 6,003,897 | A | * | 12/1999 | Dostert et al. ................ 280/781 |
| 6,120,059 | A |   | 9/2000 | Beckman |
| 6,269,902 | B1 | * | 8/2001 | Miyagawa ................... 180/312 |
| 6,408,974 | B1 | * | 6/2002 | Viduya et al. ................ 180/312 |
| 6,550,561 | B2 | * | 4/2003 | Dau et al. .................... 180/299 |
| 6,895,647 | B2 |   | 5/2005 | Matsumoto et al. |
| 7,393,015 | B1 | * | 7/2008 | Gillespie et al. ............ 280/781 |
| 2004/0205953 | A1 |   | 10/2004 | Marume et al. |
| 2007/0169982 | A1 | * | 7/2007 | Ogawa et al. ................ 180/312 |

FOREIGN PATENT DOCUMENTS

JP    2006-205811    *    8/2006

* cited by examiner

*Primary Examiner*—Paul N. Dickson
*Assistant Examiner*—George D. Spisich
(74) *Attorney, Agent, or Firm*—O'Brien Jones, PLLC

(57) ABSTRACT

The invention relates to a device for locating a subframe to a vehicle body having a control hole. The device comprises a pin attached to the subframe and extending toward the vehicle body when the subframe is positioned for mounting to the vehicle body. The pin is adapted to engage the control hole to precisely align the subframe and the vehicle body. The invention also relates to a method for locating a subframe to a vehicle body having a control hole. The method comprises providing a pin on the subframe that extends toward the vehicle body when the subframe is positioned for mounting to the vehicle body, and engaging the pin with the control hole to precisely align the subframe and the vehicle body. The present invention further relates to a method for manufacturing a subframe, comprising manufacturing a subframe having one or more bosses adapted to retain locating pins, and inserting locating pins into the one or more bosses so that the locating pins extend toward a vehicle body when the subframe is positioned for mounting to the vehicle body.

9 Claims, 4 Drawing Sheets

SUBFRAME-LOCATING DEVICE

FIELD OF THE INVENTION

This invention relates to mounting a subframe to a vehicle body. More specifically, this invention relates to increasing the precision of subframe placement and mounting using locating pins provided on the subframe. The pins may be removable.

BACKGROUND OF THE INVENTION

A subframe is a structural component of a vehicle, such as an automobile or an aircraft, that uses a discrete, separate structure within a larger body-on-frame or unit body to carry certain components, such as the engine, drivetrain, or suspension. An "isolated" subframe refers to a subframe that is a separate structure that attaches to the vehicle body. The subframe can be bolted and/or welded to the vehicle. When bolted, it is sometimes equipped with rubber bushings or springs to dampen vibration.

Body-on-frame is an automobile construction technology. Mounting a separate body to a rigid frame that supports the drivetrain was the original method of building automobiles, and its use continues to this day. Unit body is a construction technique that uses the external skin of an object to support some or most of the load on the structure.

The principal purpose of using a subframe is to isolate vibration and harshness from the rest of the body. For example, in an automobile with its powertrain contained in a subframe, forces generated by the engine and transmission can be damped enough that they will not disturb passengers. Using rubber bushings helps to dampen vibration.

Subframes are typically mounted at the bottom of a vehicle body and can be located at the front and/or the rear of a vehicle body. In a front-engine, rear-drive type of vehicle, front suspensions and an engine are mounted on a front subframe at the front side of the vehicle body, and rear suspensions and a differential gear unit are mounted on a rear subframe at the rear side of the vehicle body.

Precision in locating subframes to the vehicle body is required for maintaining critical driveline angles. Such precision may not be achievable with commonly-used mounting techniques and hardware, particularly when rubber bushings are employed. A vehicle's driveline consists of the parts of the drivetrain excluding the engine and transmission. It is the portion of a vehicle, after the transmission, that changes depending on whether a vehicle is front wheel drive, four wheel drive, all wheel drive, or rear wheel drive.

The driveline angle is the angle between the driveshaft centerline and the rear differential input shaft centerline, and is often referred to as "critical" because it affects driveline vibration. Deviant driveline angles can cause driveline vibrations, as well as driveline component durability concerns. Driveline angle is also used to offset a vehicle's transmission-to-driveshaft angle to phase the U-joint of the CV-joint appropriately to reduce velocity variation.

Known methods for precisely locating isolated subframes to the body include fixed pins located on an assembly plant decking fixture. Typically, the decking fixture holds and transports the suspension module (including a subframe) to the vehicle body, and then lifts the suspension module to the vehicle body for the decking process. The fixed pins are generally only acceptable when the assembly plant is dedicated to building a single vehicle platform, because they would likely be incompatible with any other platform's body structure and suspension/driveline system. This would be particularly true if an incremental, low-volume vehicle platform required fixed pins that would interfere with the resident vehicle platform's body structure. Compatibility would require a change in the body design or tooling on the resident vehicle platform, which would be undesirable. While the fixed pins could be tooled to fold down or collapse to accommodate different vehicle platforms, modifying existing decking fixtures with collapsible tooling for incremental, low-volume vehicles would be cost prohibitive.

FIG. 1 illustrates a prior art decking and subframe assembly used in vehicle manufacturing. As can be seen, the vehicle platform or assembly plant decking fixture includes a decking pallet. A vehicle subframe is located on the decking pallet via fixed decking pallet-to-subframe alignment pins. In this prior art embodiment, four fixed decking pallet-to-subframe pins are utilized. The decking pallet includes additional fixed pins, such as decking pallet-to-vehicle alignment pins. Using this prior art embodiment, both the subframe and the vehicle are aligned with respect to the decking pallet, and thus are aligned with respect to each other.

For vehicles utilizing isolated subframes, such as rear wheel drive and all wheel drive vehicles, locating the rear subframe to the body with precision is required for maintaining critical driveline angles. Subframes typically include four mounting fasteners and bushings, which are used to locate the subframe on the vehicle body when the subframe is attached to the vehicle body. The mounting fasteners and bushings, however, typically do not have a tight enough tolerance to properly control the critical driveline angles. Such tolerances are preferably within a degree, but may vary, for example, by vehicle.

Many vehicle platforms increase tolerance with pins (for accurate plan-view location/orientation) that are attached to the assembly plant decking fixture, where the pins route through more precise holes in the isolated subframe and body rail. In the vehicle plan view, the rear subframe/rear suspension needs to be located and decked "square" to the vehicle as closely as possible. If it is slightly rotated when decked to the vehicle, the driveshaft-to-axle angle will be affected and the rear suspension will not track straight ahead. With tight tolerance, the alignment of these holes will locate the isolated subframe accurately enough to support the driveline angle specifications for a given vehicle. The subframe fasteners are then torqued, and the decking fixture is lowered, withdrawing the pins from the body and the subframe.

Another strategy is to precisely locate the subframe on a "moon-buggy" decking fixture such as the that illustrated in FIG. 1. This fixture is then accurately located to the vehicle body via additional pins. Both of these methods use multiple fixed pins on the decking fixture to align the subframe and the vehicle body. A moon buggy decking fixture, as used herein, refers generally to a decking fixture that moves within an assembly plant, such as a decking fixture that transports a suspension module or powertrain module to the vehicle body and then lifts the module to the vehicle body for the decking process. Moon buggy decking fixtures are also referred to as pallet decking fixtures. These decking fixtures can vary greatly in design.

As can be seen from FIG. 1, the fixed pins on the decking pallet would most likely be incompatible with another platform's body structure and suspension/driveline system, and would not allow much platform flexibility for the assembly plant.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the prior art and the present invention and together with the description, further serve to explain the principles of the invention and to enable a person skilled in the pertinent art to make and use the invention.

SUMMARY OF THE INVENTION

Figure 1:
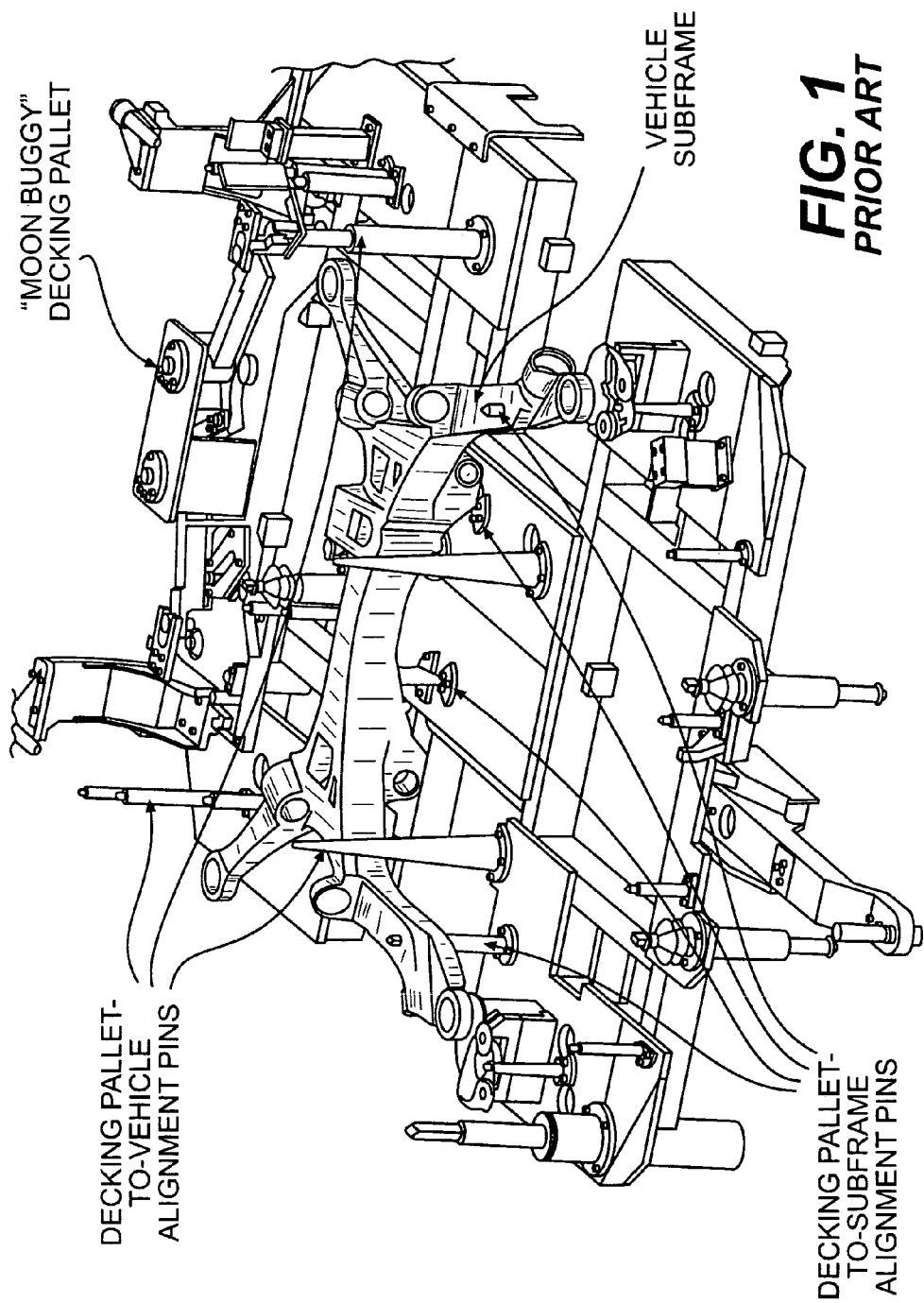
FIG. 1 illustrates a prior art decking and subframe assembly used in vehicle manufacturing.

The invention relates to a device for locating a subframe to a vehicle body having a control hole. The device comprises a pin attached to the subframe and extending toward the vehicle body when the subframe is positioned for mounting to the vehicle body. The pin is adapted to engage the control hole to precisely align the subframe and the vehicle body.

Precise alignment of the subframe and the vehicle body can limit deviation of the alignment to about plus or minus between one millimeter and two millimeters. The locating pin can be attached to subframe via a boss that extends from a surface of the subframe. The boss may include a hole and the locating pin can extend though the hole and may be threaded into the hole. The locating pin can include a tapered tip and a hex head. The hex head may be the same size as a subframe fastener and may have a left-handed thread. The device may be adapted to locate the subframe with respect to the vehicle body so that driveline angles can be controlled within a tolerance of about one degree.

The invention also relates to a method for locating a subframe to a vehicle body having a control hole. The method comprises providing a pin on the subframe that extends toward the vehicle body when the subframe is positioned for mounting to the vehicle body, and engaging the pin with the control hole to precisely align the subframe and the vehicle body.

The invention further relates to a method for manufacturing a subframe, comprising manufacturing a subframe having one or more bosses adapted to retain locating pins, and inserting locating pins into the one or more bosses so that the locating pins extend toward a vehicle body when the subframe is positioned for mounting to the vehicle body. Manufacturing the subframe may comprise one of casting and machining or stamping and welding. The subframe may comprise one of steel and aluminum. The locating pins may comprise steel. The one or more bosses may be added to the subframe after it is cast or stamped.

DETAILED DESCRIPTION OF THE INVENTION

In accordance with the present invention, locating pins are attached to the subframe itself, and can optionally be removed after the subframe is attached to the vehicle body. This allows platform flexibility in an assembly plant by not requiring fixed locating pins on the decking fixture. In an embodiment of the invention, two locating pins are employed to align the subframe with the vehicle body.

For assembly plant simplicity, a subframe including an embodiment of the device of the present invention has structure for maintaining the locating pins or rods during alignment. The structure for maintaining the pins is properly placed to allow the pins to extend into complementary alignment holes in the vehicle body to which the subframe is to be mounted. In an embodiment to the invention, the structure includes bosses extending from mounting portions of the subframe. Pins can be inserted into holes extending through the bosses and are preferably delivered as part of the completed subframe module. Alternatively, the pins can be supplied separately from the subframe and inserted prior to attaching the subframe to the vehicle body.

As stated above, placement of the pins on the subframe is driven by the need to align the pins underneath a portion of the vehicle body that would contain complimentary control holes. The portions of the vehicle body that commonly contain control holes include the body rails or the crossmembers. A crossmember is a section of metal such as steel, usually boxed, that is bolted across the frame of a vehicle to support the vehicle's engine and/or transmission.

According to an embodiment of the present invention, tolerances are within a degree, but may vary, for example, by vehicle. In an embodiment of the invention, the level of precision obtained when attaching the subframe to the vehicle body is about plus or minus 1 millimeter to 2 millimeters.

Figure 2:
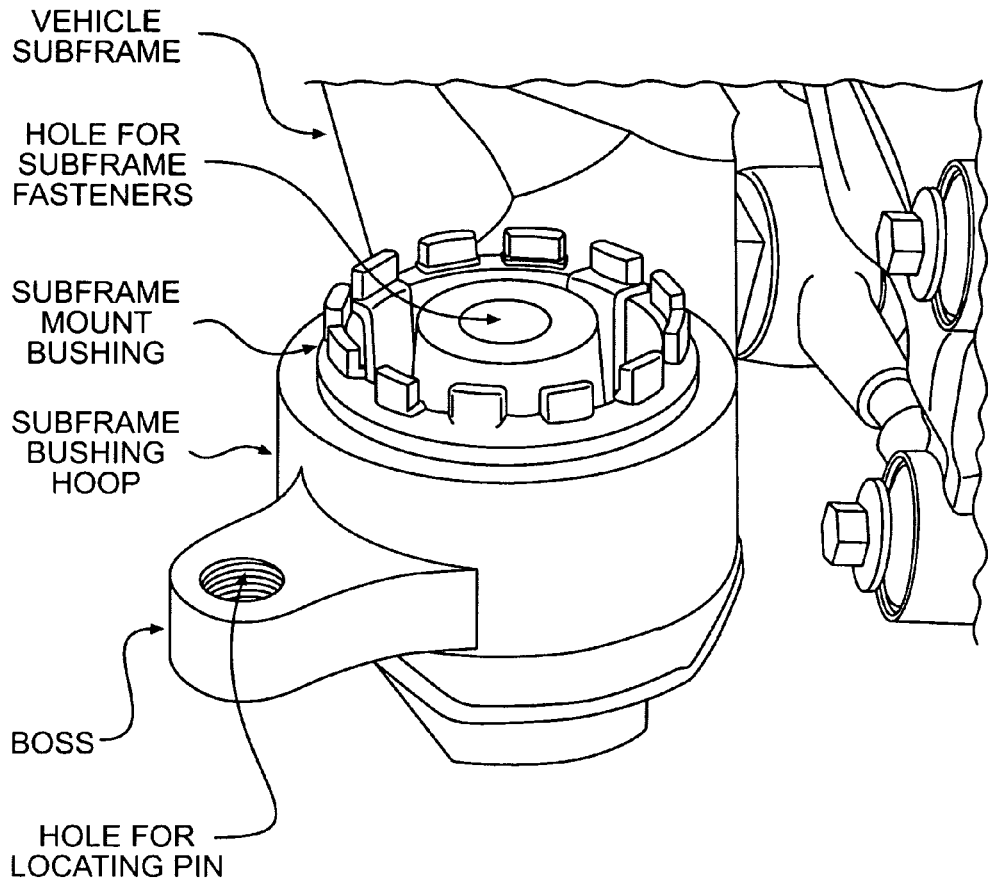
FIG. 2 illustrates a portion of a vehicle subframe including a device in accordance with an embodiment of the invention.
Figure 2:
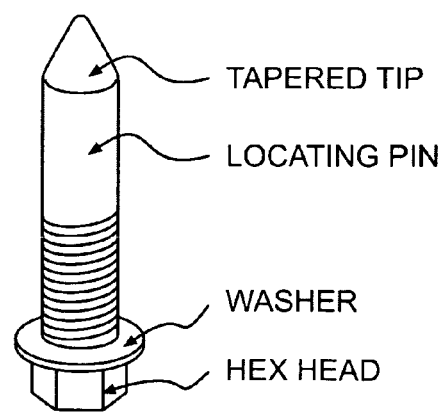

FIG. 2 illustrates an embodiment of a device according to the present invention. As shown, a vehicle subframe includes a bushing hoop housing a mounting area having a mounting bushing. The mounting bushing includes a central hole for insertion of a subframe fastener that will fasten the subframe to the vehicle. In this embodiment, on or more bosses are provided for guiding and/or retaining the locating pins. As shown, in this embodiment, the boss extends from an exterior surface of the bushing hoop and includes a hole into which a locating pin can be inserted. The term "boss," as used herein, refers generally to a protruding portion. In an embodiment of the invention where the locating pin is threaded, the hole through the boss is preferably provided with complimentary threading. The dimensions of the boss need only be large enough that the boss is strong enough to retain the locating pin while it is used to align the subframe with the vehicle body. The present invention contemplates different sized bosses depending on the material composition of the boss. A stronger material will provide suitable strength with smaller dimensions. It is to be understood that the location and shape of the boss can vary, as can its composition and size.

An exemplary embodiment of a locating pin is also shown in FIG. 2. In this embodiment, the locating pin is threaded and includes a tapered tip that helps guide the pin into the boss hole and a control hole in the vehicle body. The locating pin also includes a hex head, and may additionally include a washer to assist in supporting loads exerted on the locating pin. The length and material composition of the locating pin may vary, and need only be long enough and strong enough, respectively, to perform the intended function of mating with the control hole in the vehicle body. It is to be understood that the locating pin may have a variety of lengths, cross-sectional shapes, and compostions. The locating pin need not have a tapered tip or a hex head. In an embodiment of the invention where the locating pin has a hex head that is the same size as a hex head of the subframe fasteners, a single tool can insert the subframe fasteners and remove the locating pin. Further, in an embodiment of the invention where the locating pin has left-handed threads, the tool that inserts the subframe fasteners does not have to reverse direction to remove the locating pin.

In an embodiment of the invention, the locating pin is made from a metal of suitable strength. In an embodiment of the invention, the locating pin comprises steel.

Figure 3:
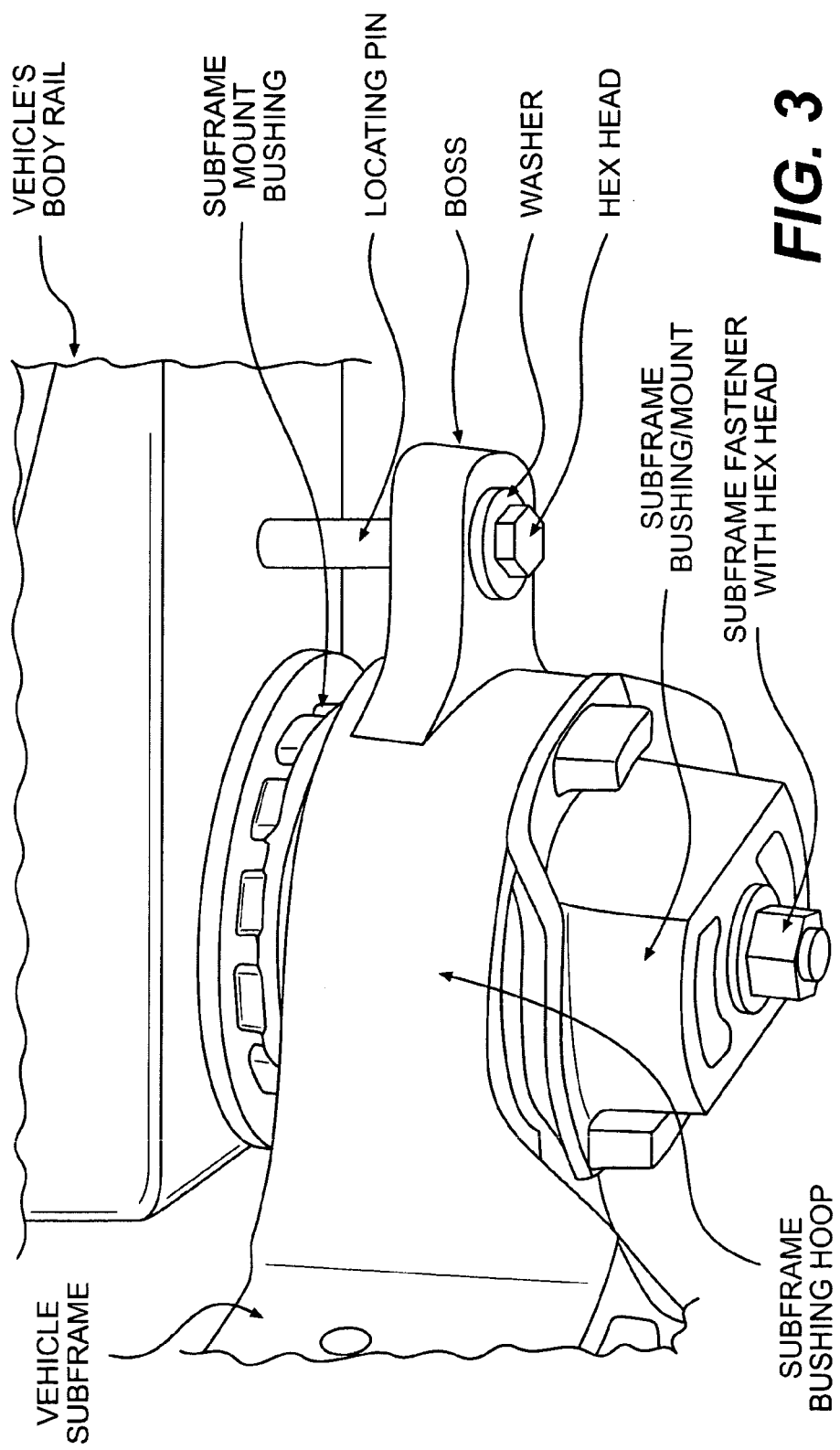
FIG. 3 illustrates the embodiment of FIG. 2, after the subframe is attached to the vehicle body.

FIG. 3 illustrates the embodiment of FIG. 2, with the subframe mounted directly under a vehicle body rail. The boss extends from the bushing hoop of the subframe so that it rests under a portion of the vehicle (here, the body rail) that includes a control hole. If the pin is already mounted to the subframe, the pin will be aligned with the control hole and inserted into the control hole to properly locate the subframe with respect to the vehicle body to maintain critical driveline angles when the subframe is mounted to the vehicle body. Alternatively, if the pin is not mounted to the subframe body, the hole through the boss can be aligned with the vehicle body control hole, and then the locating pin can be inserted through both holes. The locating pins preferably remain in place until the subframe is mounted to the vehicle using subframe fasteners, and then may be removed and discarded, recycled, or kept with the vehicle as a tool for later use.

Figure 4:
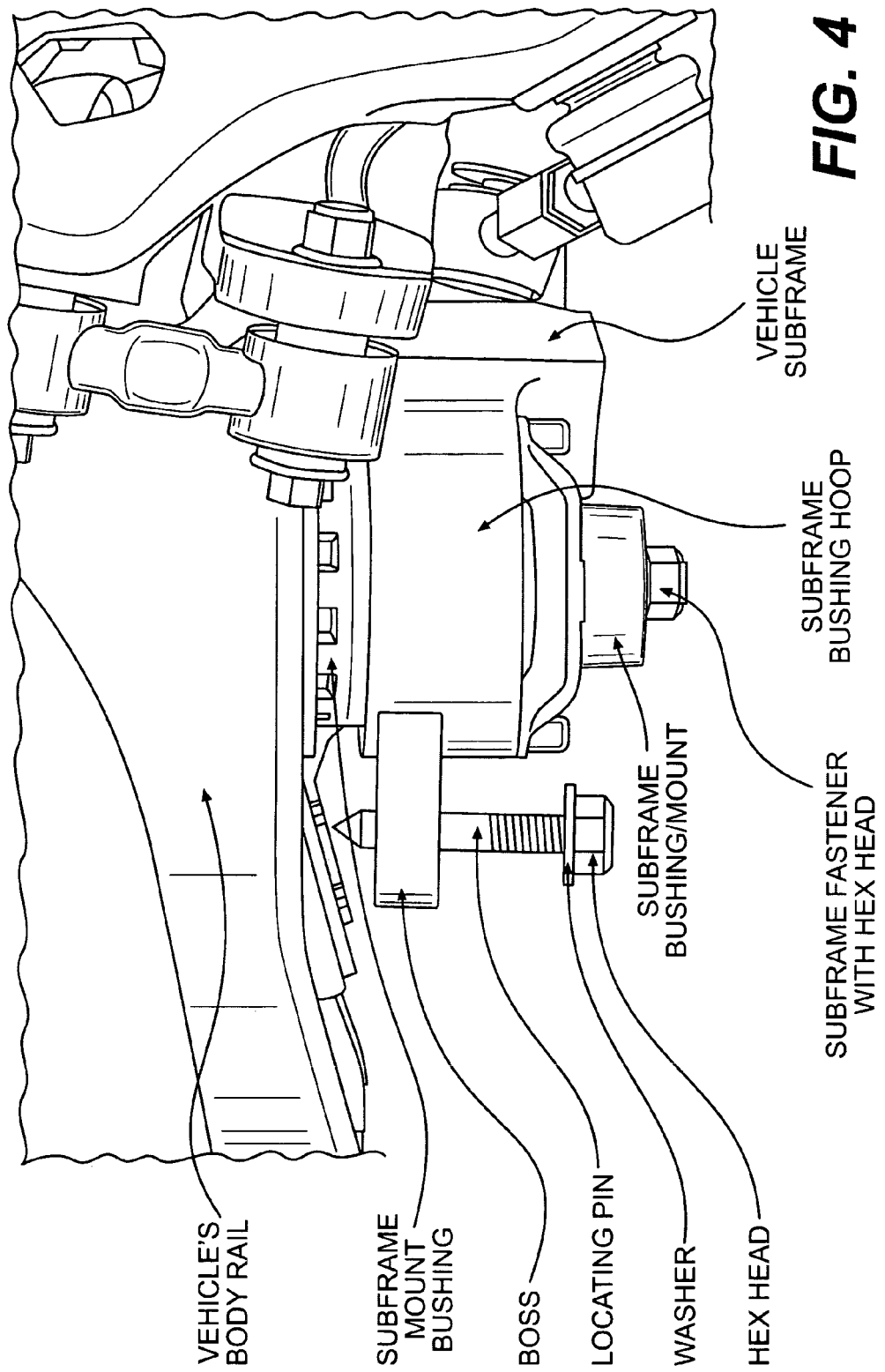
FIG. 4 illustrates another view of the assembled subframe and vehicle body according to the embodiment of FIG. 2.

In the embodiment illustrated in FIG. 3, the hex head of the subframe fasteners is the same size as a hex head of the locating pin, so that the same tool can be used on both the subframe fastener and the locating pin. The size of the hex heads may vary, and need only be capable of the torque required to properly deck the subframe. In an embodiment of the invention, an M14 bolt is used with hex head sizes anywhere from 12 mm to 20 mm. FIG. 4 illustrates the spatial relationship of the hex head of the subframe fastener and the hex head of the locating pin, which shows how a single tool could easily insert the subframe fasteners and remove the locating pin at a single station, particularly if the hex heads were the same size and the locating pin had a left-handed thread.

If the locating pins are removed from the subframe after it is attached to the vehicle body, they can be discarded, recycled back to the subframe module assembly line, or kept with the vehicle as a service tool for the customer or dealer. The pins could be used to re-align the subframe to proper driveline angles if the subframe was ever removed or replaced.

Although preferred embodiments of the invention have been described herein, it will be understood by those skilled in the art that variations may be made without departing from the spirit of the invention or the scope of the appended claims. For example, the device may be used to align other assembled parts that require a certain degree of precision, including subframes for vehicles such as aircraft, heavy machinery, or large trucks, or any other application that requires mounting an isolated subframe or structure to another structure with precision. In addition, other structure than a boss can be used to position the locating pins, and that structure need not be permanently attached to the subframe. The pin, in fact, need not be removable. The structure used to position the locating pins, such as the illustrated boss, can be integrally cast and machined or stamped and welded as part of the subframe, or can be added to the subframe after it is manufactured. Indeed, the structure used to position the locating pins can itself be removable from the subframe after the subframe has been decked. A removable structure could include one that is removably fastened to the subframe, for example via a screw or cotter pin.

The structure used to position the locating pins may comprise the same material as the subframe (e.g., steel or aluminum), but is also contemplated to comprise a different material than the subframe. The invention contemplates a variety of methods for retaining the locating pin on the subframe, such as a cotter pin or other manual attachment methods.

The present invention contemplates a wide variety of suitable locations for the locating pins. The pins can be located anywhere on the subframe, most likely along the path that the vehicle body rail follows. The location could be driven, for example, by the need to use a master locator hole on the body structure, which is usually on the body rails but could also be on a body crossmember, etc., as long as for accurate plan-view location/orientation is provided. The present invention also contemplates a single structure or boss used to retain two locating pins in such a manner that accurate plan-view location/orientation is obtained.

What is claimed is:

1. A device for locating a subframe to a vehicle body having a control hole, the device comprising:
    a locating pin removably attached to the subframe via a boss that extends from a surface of the subframe, and positioned to align with a complimentary control hole on the vehicle body when the subframe is positioned for mounting to the vehicle body,
    wherein the locating pin is adapted to temporarily engage the control hole to precisely align the subframe and the vehicle body while the subframe is being mounted to the vehicle body and to disengage the control hole after the subframe is mounted to the vehicle body, and
    wherein the locating pin extends through a threaded pin hole in the boss.

2. The device of claim 1, wherein precise alignment of the subframe and the vehicle body limits deviation of the alignment to a range of about plus or minus one to two millimeters.

3. The device of claim 1, wherein the locating pin includes a tapered tip.

4. The device of claim 1, wherein the locating pin is threaded into the pin hole in the boss.

5. The device of claim 4, wherein the locating pin includes a hex head.

6. The device of claim 5, wherein the locating pin is adapted to engage the control hole while the subframe is being mounted to the vehicle body using a fastener having a hex head, and the locating pin hex head is the same size as the fastener hex head.

7. The device of claim 4, wherein the locating pin includes a left-handed thread.

8. The device of claim 1, wherein the device is adapted to locate the subframe with respect to the vehicle body so that driveline angles are controlled within a tolerance of about one degree.

9. The device of claim 1, wherein the locating pin engages the control hole while a fastener secures the subframe to the vehicle body, and disengages the control hole after the fastener secures the subframe to the vehicle body.

* * * * *